(12) United States Patent
Bestgen et al.

(10) Patent No.: US 6,923,234 B2
(45) Date of Patent: Aug. 2, 2005

(54) TIRE WITH A REINFORCED BEAD

(75) Inventors: Luc Bestgen, Chatel-Guyon (FR); Michel Ahouanto, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 16 days.

(21) Appl. No.: 10/721,270

(22) Filed: Nov. 26, 2003

(65) Prior Publication Data

US 2004/0103969 A1 Jun. 3, 2004

Related U.S. Application Data

(63) Continuation of application No. PCT/EP02/05481, filed on May 17, 2002.

(30) Foreign Application Priority Data

May 31, 2001 (FR) .............................. 01 07202

(51) Int. Cl.⁷ ......................... B60C 15/06; B60C 9/07; B60C 9/09; B29D 30/32; B29D 30/38
(52) U.S. Cl. ...................... 152/543; 152/561; 152/562; 156/132; 156/133; 156/135
(58) Field of Search ............................. 152/543, 561, 152/562; 156/132, 133, 135

(56) References Cited

U.S. PATENT DOCUMENTS

| | | | |
|---|---|---|---|
| 1,461,984 A | * | 7/1923 | Pfeiffer ....................... 152/562 |
| 3,062,259 A | | 11/1962 | Boussu et al. |
| 3,480,065 A | | 11/1969 | Verdier |
| 3,934,634 A | | 1/1976 | Verdier |
| 5,164,029 A | | 11/1992 | Oohashi et al. |
| 5,415,216 A | | 5/1995 | Kajiwara et al. |

FOREIGN PATENT DOCUMENTS

| | | |
|---|---|---|
| DE | 21 64 366 B1 | 6/1973 |
| EP | 0 301 093 A1 | 2/1989 |
| JP | 02 144201 B1 | 6/1990 |

* cited by examiner

*Primary Examiner*—Adrienne C. Johnstone
(74) *Attorney, Agent, or Firm*—Burns, Doane, Swecker & Mathis, L.L.P.

(57) ABSTRACT

Tire including at least one carcass reinforcement of at least one ply anchored in each bead B to at least one bead wire, each bead being reinforced by at least two reinforcement plies formed of reinforcing elements inclined relative to the circumferential direction at an angle between 10° and 30°, said reinforcement plies being axially adjacent to the carcass ply wherein the reinforcing elements of at least one ply of the carcass reinforcement, in each part adjacent to the two bead reinforcement plies, are inclined relative to the circumferential direction at an angle between 50° and 80° and are radial in the part located between the radially upper ends of said two reinforcement plies, said ends being located radially outside the sidewall points that define the maximum axial width of the tire when mounted on its intended wheel rim and inflated.

7 Claims, 1 Drawing Sheet

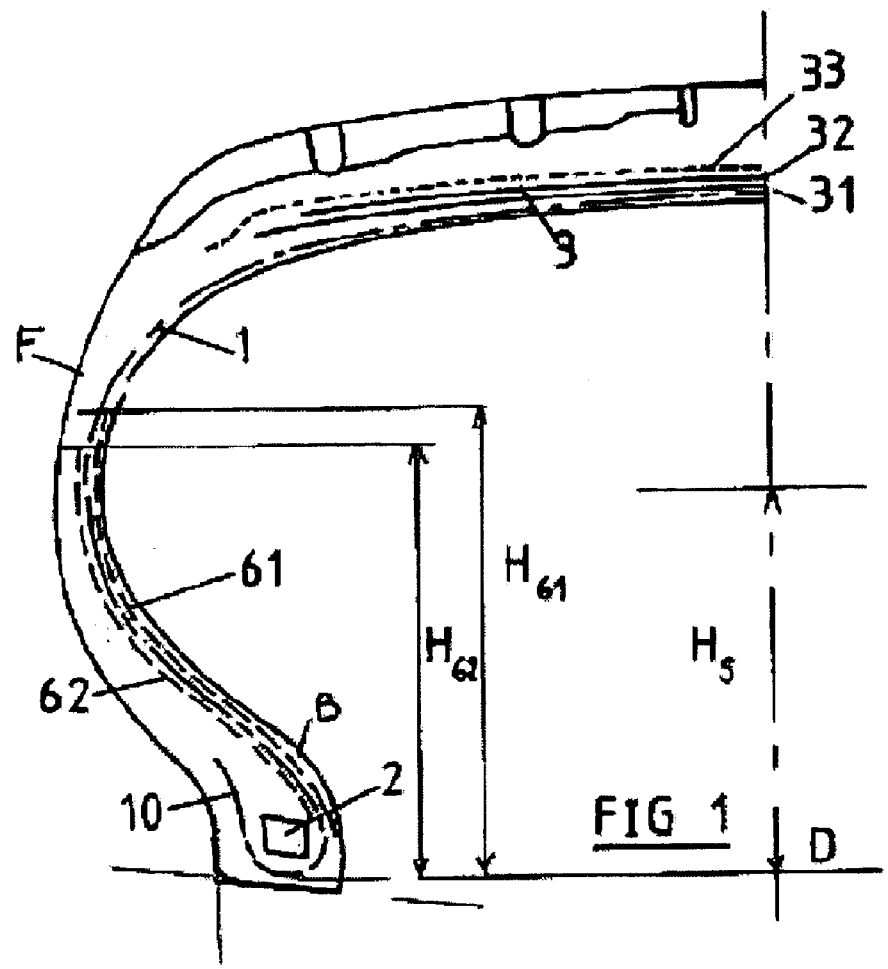
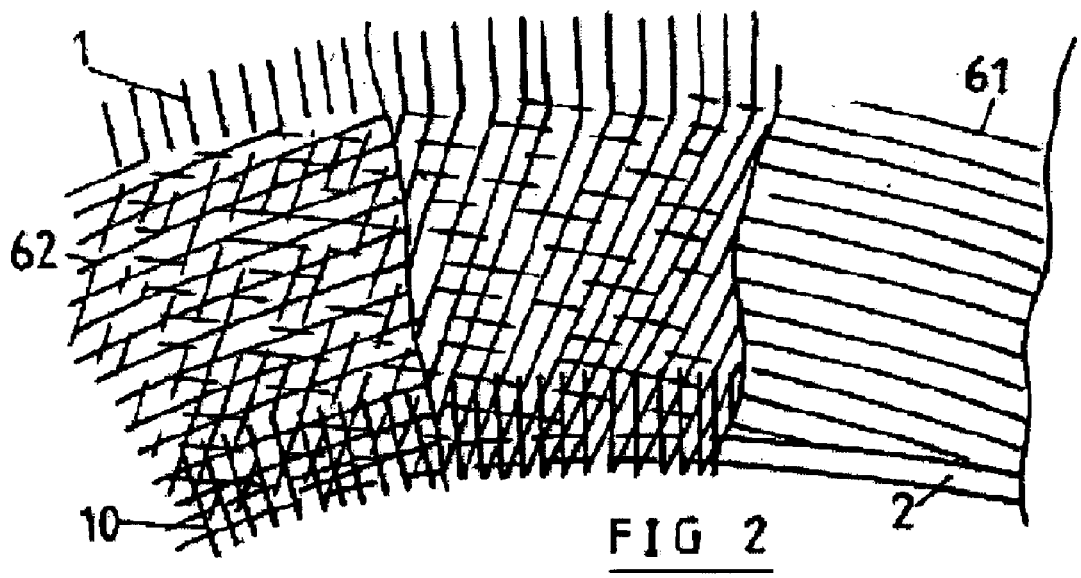

TIRE WITH A REINFORCED BEAD

This application is a continuation of international PCT application Serial No. PCT/EP02/05481, filed May 17, 2002, which was published in English as WO 02/096675 A1 on Dec. 5, 2002, and which is incorporated by reference.

The invention concerns a tire with a carcass reinforcement comprising largely radial reinforcing elements, said carcass reinforcement being surmounted by a crown reinforcement formed more particularly of textile reinforcing elements and said tire being in particular intended for fitting to passenger cars.

While having numerous advantages, especially that of being very light, such a tire is not without disadvantages: it does not have sufficient endurance at high speed, an endurance evaluated by two performance characteristics, namely the maximum (or limit) speed reached by the tire when rolling under normal conditions and the actual endurance at a high speed, though one lower than said limit speed. For example, a crown reinforcement formed of two crossed crown plies made of an aromatic polyamide and a ply of circumferential cables made of an aliphatic polyamide will not allow a speed higher than 250 km/h because the crossed crown plies show certain weaknesses at high speed.

The structure of such a crown reinforcement can be modified in many ways, for example at least one working crown ply can be turned up. Similarly, the choice of the materials used to make said reinforcement is an important factor as a function of the compromise between properties that it is desired to obtain: a crown consisting exclusively of reinforcing elements made of rayon does not confer upon the tire the rigidities required, especially in the transverse direction; a crown consisting exclusively of elements made of aromatic polyamide entails difficult and onerous manufacture due to lack of additional shaping ability; similarly, a reinforcement consisting exclusively of reinforcing elements made of aliphatic polyamide requires too large a number of crown plies and hence becomes prohibitively heavy.

Studies of the structure of cables made from such materials (number of elementary filaments, number of strands, twists, etc.) have not yet made it possible to obtain results deemed to be satisfactory. The Applicant undertook studies to find solutions to the problem that arises in the constitution of tire beads.

The Applicant's patent GB 1 072 305, which aims to minimize the displacement of radial cables in the carcass reinforcement relative to one another and to put the rubber mixture under tension between cables, recommends the addition to the ply or plies of radial cables, of at least one ply of non-radial cables arranged between the bead and the tread, the acute angle formed between an inclined cable of said ply and a radial cable of the carcass ply being able to be between 30° and 70° and the sum of the strengths per centimeter of the plies of inclined cables being at most equal to half the sum of the strengths per centimeter of the radial cables.

To improve the stability of the path of a vehicle fitted with a tire subjected to lateral forces while preserving its comfort, patent U.S. Pat. No. 3,480,065 recommends positioning in the sidewalls, between the bead wires and the sidewall areas where the axial width of the tire is maximum, plies of elastic wires or cables that are inclined and crossed, between the main part and the turn-up of the carcass reinforcement, said inclined cables making an angle between 45° and 75° relative to the radial cables.

In the case of maintenance vehicles and to avoid instability phenomena (rolling, swaying, pitching), patent EP 0 301 093 A recommends arranging over the full height of the sidewalls and axially on either side of the carcass reinforcement a ply of wires or cables oriented at a small angle relative to the circumferential direction.

U.S. Pat. No. 5,415,216, which concerns high-performance tires for passenger cars and aims to reduce the weight of such tires having a small form ratio without adverse effect on their directional qualities, proposes to abandon the use of the triangular sections usually located radially above the head wires that anchor the carcass reinforcement and to arrange in each sidewall, on either side of the main part of the carcass reinforcement, a ply of reinforcing elements inclined at an angle between 15° and 75° relative to the radial direction, said reinforcing elements being made of a material usually used in tires: aromatic or aliphatic polyamide, polyester, metal, glass fiber, etc.

The documents cited above associate a radial carcass reinforcement extending from one bead wire to the other with at least one ply of inclined elements in the bead zone. To solve the problem addressed by the present invention, it is proposed to associate within each bead zone at least two reinforcement plies of reinforcing elements inclined relative to the circumferential direction with at least one carcass reinforcement ply whose reinforcing elements are inclined within said bead zone and radial between the ends radially outside the two reinforcement plies of each bead.

Thus, the tire according to the invention, which comprises at least one carcass reinforcement formed of at least one ply consisting of reinforcing elements and anchored in each bead to at least one circumferential reinforcing element (such as a bead wire), each bead being reinforced by at least two reinforcement plies formed of reinforcing elements inclined relative to the circumferential direction at an angle between 10° and 30° and crossed from one ply to the next, these reinforcement plies being axially adjacent to the carcass reinforcement, is characterized in that the reinforcing elements of at least one carcass reinforcement ply, in each part that is axially adjacent to the two bead reinforcement plies, are inclined relative to the circumferential direction at an angle between 50° and 80°, the same reinforcing elements being radial in the part located between the ends that are radially outside said two reinforcement plies, said ends being located radially outside the sidewall points that define the maximum axial width of the tire when fitted on its intended wheel rim and inflated.

The carcass reinforcement is preferably formed of at least one ply comprising textile reinforcing elements, advantageously ones made of polyester. The reinforcing elements that constitute the two bead reinforcement plies are preferably made of the same material as that used for the carcass elements. The angles formed by the elements of the two bead reinforcement plies, although they can have an equal absolute value, are preferably unequal in order to allow easier manufacture of the tire.

The meaning here of 'radial' reinforcement is that each reinforcement makes an angle between 80° and 110° relative to the circumferential direction. By 'adjacent' is meant that at least one bead reinforcement ply is in contact with the carcass ply.

Advantageously, the carcass ply is inserted between the bead reinforcement plies and in the part located between said reinforcement plies the reinforcements of said carcass ply form an angle between 50° and 80° relative to the circumferential direction.

Large-size tires for passenger cars (i.e. 205/60 R 16 and above) generally have a carcass reinforcement consisting of two plies of radial reinforcing elements; for such sizes a tire according to the invention can then be provided with three bead reinforcement plies, the carcass plies being inserted totally or in part between the reinforcement plies.

BRIEF DESCRIPTION OF THE DRAWINGS

The characteristics and advantages of the invention will be better understood with the help of the description below, illustrated by the attached drawing which shows:

FIG. 1: Schematic representation of a passenger car tire according to the invention, seen in meridian section FIG. 2: Schematic representation of the same tire, viewed in profile

DETAILED DESCRIPTION

The tire P, of size 175/70 R 13, comprises a carcass reinforcement consisting in the case considered of a single carcass ply 1 formed of polyester reinforcing elements. In each bead this carcass ply 1 is anchored to a bead wire 2 of usual constitution for the size concerned, forming a turn-up 10. It is surmounted radially on the outside by a crown reinforcement 3 comprising two working plies with free edges, said working plies 31, 32 being formed by aromatic polyamide reinforcing elements crossed from one ply 31 to the next 32 and inclined relative to the circumferential direction at an angle essentially equal to 25° (it should be noted that the angles of the elements forming the two working plies 31 and 32 can be unequal without going beyond the scope of the invention). A hooping ply 33 of aliphatic polyamide reinforcing elements is arranged radially outside the working ply 32, the cables of said hooping ply 33 making an angle of 0°±2.5° with the circumferential direction.

The beads B and sidewalls F of the tire are reinforced by two additional plies 61 and 62 of textile reinforcing elements made of polyester, i.e. they are of the same nature as the material of the reinforcing elements of the carcass ply. One of said additional plies 61 is located axially on the inside of the main part of the carcass ply 1 (i.e. the part not forming the turn-up 10) and the other additional ply 62 is located axially on the outside. The cables of the additional plies form angles with the circumferential direction respectively of +15° and −15°, these angle being measured at the level of the radially inside edges of the plies 61 and 62, said edges being radially located close to the anchoring bead 2.

As for the radially outer ends of the reinforcement plies 61 and 62, viewed in section these are respectively at distances H61 and H62 from the base D of the beads (the base D being a line parallel to the rotation axis passing through the point of intersection between the generatrix of the bead seat and the generatrix of the vertical wall of said bead) respectively equal to 82 mm and 76 mm, those distances being larger than the distance HS separating the point where the tire is axially widest from the base D.

Relative to the circumferential direction, the reinforcements of the carcass ply 1 make an average angle of −65° in the part inserted axially between the two reinforcement plies 61 and 62, while the same reinforcements made an angle of 90° in the remainder (i.e. radially outside the ends radially outside the bead reinforcement plies).

The angular variations of the cables of the carcass ply 1 and the angular variations between the reinforcement plies 61 and 62 can be obtained by a simple fabrication process of the unvulcanized cylindrical blank of the carcass ply. The stages of that process are as follows:

a rubber layer forming the internal layer is positioned, followed as necessary by the positioning of reinforcements, sections, etc.

a reinforcement ply 61 comprising reinforcements that make an angle smaller than 30° with the circumferential direction is positioned, a carcass ply 1 of radial cables (angle equal or close to 90°) is positioned, taking care to ensure good contact and strong adhesion in the uncured state between the carcass ply 1 and the reinforcement ply 61 (for example by applying an appropriate pressure by rolling), an intermediate layer is positioned over the carcass ply 1 followed by the positioning of a reinforcement ply 62, the effect of said intermediate layer being to prevent contact and adhesion between the carcass ply 1 and the reinforcement ply 62 positioned over said intermediate layer, a bead wire 2 and the necessary rubber sections are positioned, between the ply 62 and the turn-up of the carcass ply 1, the carcass ply 1 is turned up around the bead wire 2, the cylindrical carcass blank is finished.

As is known, this blank is then shaped to a diameter larger than that of the building drum, to become a toric carcass blank onto which the plies forming the crown of the tire are deposited.

During the shaping, the inclination of the reinforcements in the bead reinforcement ply 61 gives rise to some de-radialization of the cables of the carcass ply 1, at least over the axial width where the ply 61 is placed, and this leads to a decrease of the angle of the carcass ply cables, said angle varying from 90° to −65°, while the angle of the cables of the ply 61 varies within an interval from +15° to +10°, and the cables of the reinforcement ply 62 axially outside the carcass ply 1 and detached therefrom undergo a similar modification, triangulating with the turn-up of the carcass ply. Once the shaping and positioning of the elements that make up the tire have been completed in the uncured state and the intermediate layer has been removed, the tire is vulcanized in the normal way.

Not only is the tire so obtained light because of the use of textile materials and not only does it largely overcome the inadequacies related to limit speed and to the endurance at high speed of a textile tire with an ordinary bead reinforcement ply, but it also has the particular property of preserving a rolling resistance at most equal to that of said ordinary tire over the whole of the speed range concerned, and even reduces the rolling resistance at high speed.

This same principle in the construction of a tire carcass blank can easily be applied in the case when the two additional bead reinforcement plies are adjacent to the carcass ply and all located on the same side of said carcass ply; for example, by positioning an intermediate layer between the additional reinforcement plies while ensuring good contact and adhesion in the uncured state between the carcass ply and the reinforcement ply closest to it.

The crown reinforcement of the tire can be metallic and may consist in particular of two plies of inextensible steel cables crossed from one ply to the next. The invention then has the enormous advantage of making it possible to do without the ply of circumferential aliphatic polyamide cables, with no adverse effect on the strength and endurance at high speed, and also allowing an appreciable reduction of the level of external noise emitted by the tire.

It is specified that the reinforcements of the additional bead plies can be of different natures (for example, one ply may consist of metallic reinforcements while the other ply consists of textile reinforcements).

What is claimed is:

1. A tire comprising at least one carcass reinforcement formed of at least one ply formed of reinforcing elements and anchored in each bead B to at least one circumferential reinforcing element (such as a bead core), each bead B being reinforced by at least two reinforcement plies formed of reinforcing elements inclined relative to the circumferential direction at an angle between 10° and 30° and crossed from one ply to the next, said reinforcement plies being axially adjacent to the carcass reinforcement, wherein the reinforcing elements of at least one carcass reinforcement ply, in each part adjacent to the two bead reinforcement plies, are inclined relative to the circumferential direction at an angle between 50° and 80°, the same reinforcing elements being radial in the part located between the radially upper ends of said reinforcement plies, said ends being located radially outside the sidewall points that define the maximum axial width of the tire when fitted to its intended wheel rim and inflated.

2. The tire according to claim 1 wherein in at least one bead, the carcass reinforcement ply passes between the additional bead reinforcement plies.

3. The tire according to claim 1 wherein the reinforcing elements of the carcass ply and of the reinforcement plies are made of textile material.

4. The tire according to claim 3 wherein it comprises a crown reinforcement composed of several reinforcement plies whose reinforcing elements are textile cables.

5. The tire according to claim 1 wherein the reinforcement plies are formed of reinforcing elements crossed over from one ply to the next at angles whose absolute values are unequal.

6. A process for the fabrication of a tire according to claim 1 and comprising the following stages:

- a rubber layer forming the internal layer is positioned, followed as necessary by the positioning of reinforcements, sections, etc.
- a reinforcement ply comprising reinforcements that make an angle smaller than 30° with the circumferential direction is positioned,
- a carcass ply of radial cables (angle equal or close to 90°) is positioned, taking care to ensure good contact and strong adhesion in the uncured state between the carcass ply and the reinforcement ply,
- an intermediate layer is positioned over the carcass ply followed by the positioning of a reinforcement ply over said intermediate layer, the effect of said intermediate layer being to prevent contact and adhesion between the carcass ply and the reinforcement ply,
- a bead wire and the necessary rubber sections are positioned between the ply and the turn-up of the carcass ply,
- the carcass ply is turned up around the bead wire,
- the cylindrical carcass blank is finished by shaping,
- the intermediate layer is removed and the shaping of the unvulcanized tire is completed,
- the tire is vulcanized.

7. The process for the fabrication of a tire according to claim 2 wherein during the making up of a cylindrical carcass reinforcement blank on a drum, the carcass ply and a radially adjacent reinforcement ply are firmly attached to one another by adhesion in the uncured state, whereas the reinforcement ply positioned above the carcass ply is detached from the carcass ply.

* * * * *